(12) United States Patent
Tian

(10) Patent No.: US 10,518,610 B2
(45) Date of Patent: Dec. 31, 2019

(54) AIR OUTLET ASSEMBLIES FOR VEHICLE VENTILATION SYSTEMS

(71) Applicant: Ford Global Technologies, LLC, Dearborn, MI (US)

(72) Inventor: Evan Tian, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 295 days.

(21) Appl. No.: 15/455,392

(22) Filed: Mar. 10, 2017

(65) Prior Publication Data

US 2017/0274736 A1 Sep. 28, 2017

(30) Foreign Application Priority Data

Mar. 25, 2016 (CN) .......................... 2016 1 0178684

(51) Int. Cl.
*B60H 1/34* (2006.01)

(52) U.S. Cl.
CPC .................. *B60H 1/3421* (2013.01)

(58) Field of Classification Search
CPC .............. F24F 13/082; F24F 13/1413; F24F 2013/1493; B60H 1/3421; B60H 1/34; B60H 1/3428; B60H 1/00871
USPC .................. 454/155, 284, 319, 268
See application file for complete search history.

(56) References Cited

U.S. PATENT DOCUMENTS

| | | | |
|---|---|---|---|
| 3,735,691 A * | 5/1973 | Gofton ................. | F24F 13/075 454/155 |
| 3,861,281 A | 1/1975 | Godwin | |
| 4,345,510 A * | 8/1982 | Sterett ................. | B60H 1/3428 454/155 |
| 5,393,010 A * | 2/1995 | Renck ................. | B65H 75/187 242/613.5 |
| 5,441,451 A * | 8/1995 | Jeung ................. | F24F 13/1413 454/313 |
| 5,878,806 A | 3/1999 | Denk et al. | |
| 6,131,336 A | 10/2000 | Krause et al. | |
| 6,254,475 B1 | 7/2001 | Valeo | |
| 7,997,964 B2 | 8/2011 | Gehring et al. | |
| 9,073,408 B2 | 7/2015 | Hoke et al. | |
| 2014/0284123 A1 * | 9/2014 | Bourqui ............... | B60K 11/085 180/68.1 |
| 2014/0315478 A1 * | 10/2014 | Kim ..................... | B60H 1/3421 454/155 |

* cited by examiner

Primary Examiner — Edelmira Bosques
Assistant Examiner — Phillip Decker
(74) Attorney, Agent, or Firm — Vichit Chea; Kolitch Romano LLP

(57) ABSTRACT

The present disclosure provides an air outlet assembly for a vehicle ventilation system. The air outlet assembly includes a housing; a plurality of vanes having ends rotatably reside on the housing; and a flexible linkage including a plurality of first rods connecting to the vanes' ends, respectively and a second rod connecting the first rods. The first rods and the second rod of the flexible linkage are integrally formed.

12 Claims, 4 Drawing Sheets

AIR OUTLET ASSEMBLIES FOR VEHICLE VENTILATION SYSTEMS

RELATED APPLICATION

This application claims the benefit of Chinese Patent Application No.: CN201610178684.3 filed on Mar. 25, 2016, the entire contents thereof being incorporated herein by reference.

TECHNICAL FIELD

The present application relates to the field of vehicles, in particular to an air outlet assembly for a vehicle ventilation system.

BACKGROUND

As is well known, the ventilation system of a vehicle delivers air to the passenger cabin through an air outlet assembly. Common locations for an air outlet assembly include a location above the instrument panel for the front-seat passengers (e.g., at the central control panel or on the driver side and the passenger side), a location at the control console or roof where such an air outlet assembly may be installed to provide ventilation for the back seats.

Based on customer's needs, an air outlet assembly is usually installed on the surface of the interior decoration panel near passengers. Passengers can adjust the direction of the air outlet assembly to change the direction of the air flowing from the air outlet assembly. However, in existing technologies, air outlet assemblies often use rigid linkages to enable the adjustment of the direction of air flows. In the above structure, pivot shafts must be installed where the linkages are hinged so that the direction of the vanes of the air outlet assembly may be adjusted. As such, the structure of the air outlet assembly is complex and unstable.

SUMMARY

To address the problems in the relevant technology, the goal of the present disclosure is to provide a structurally simple and stable air outlet assembly for a vehicle ventilation system.

In order to solve the above problems, the present disclosure provides an air outlet assembly for a vehicle ventilation system. The air outlet assembly comprises a housing; a plurality of vanes, wherein the ends of the vanes rotatable reside on the housing; and a flexible linkage, the flexible linkage having a plurality of first rods connected to the ends of the vanes, respectively, and a second rod connecting the first rods, wherein the first rods and the second rod are integrally formed.

According to one embodiment of the present disclosure, the housing includes a sidewall and a supporting frame having a plurality of openings, the end of each vane extends through a corresponding opening, and the flexible linkage is located within a gap between the supporting frame and the sidewall.

According to one embodiment of the present disclosure, the supporting frame further includes a flange for shielding the gap.

According to one embodiment of the present disclosure, the end of each vane has a longitudinal groove for accommodating a first rod.

According to one embodiment of the present disclosure, each first rod comprises a first end and a second end, which are opposite to each other, wherein the second rod is connected to a plurality of first ends, and the flexible linkage further includes a third rod that is connected to a plurality of the second ends.

According to one embodiment of the present disclosure, all first rods are parallel to each other, and the second rod is parallel to the third rod.

According to one embodiment of the present disclosure, the end of each vane has an annular cross-section, wherein each first rod runs across the annular end of the corresponding vane.

According to one embodiment of the present disclosure, the end of each vane is in an interference fit with the corresponding opening.

According to one embodiment of the present disclosure, the flexible linkage is an elastically deformable part.

According to one embodiment of the present disclosure, the flexible linkage is a rubber frame part.

According to another aspect of the present disclosure, an air outlet assembly for a vehicle ventilation system is provided. The air outlet assembly comprises a housing, a plurality of vanes having a plurality of ends, and a flexible linkage. The plurality of vanes are disposed in the housing. The flexible linkage includes a plurality of first rods and a second rod, and the plurality of the first rods are spaced apart each other and connected the second rod along a lengthwise direction of the second rod. The plurality of first rods are connected to the plurality of ends of the vanes, respectively, and the flexible linkage is deformed when one of vane is rotated such that the rotation of the one vane enables rest of the vanes to rotate in a substantially same angle via the linkage.

According to one embodiment of the present disclosure, the air outlet assembly further comprises a supporting frame having a main body, a plurality of openings, and a flange extending substantially perpendicular from the main body. The plurality of ends of the vane extend through the plurality of openings, respectively. The flexible linkage is disposed in a space between a sidewall of the housing and the supporting frame, and the flange is configured to cover the space.

According to one embodiment of the present disclosure, each of the plurality of ends of the vanes has a longitudinal groove for receiving a corresponding first rod of the flexible linkage and to connect the corresponding first rod via an interference fit.

According to one embodiment of the present disclosure, each of the plurality of first rods of the flexible linkage has a first end and a second end opposite to the first end, and the second rod is connected to a plurality of first ends, and the flexible linkage further includes a third rod that is connected to a plurality of second ends.

According to one embodiment of the present disclosure, the plurality of first rods are substantially parallel to each other, and the second rod and the third rod are substantially parallel. Each of the plurality of ends of the vanes has an annular cross-section. A distance between two adjacent first rods is greater than a diameter of the annular cross-section and a length of the first rod is substantially the same as or slightly greater than a diameter of an annular end of the vane.

According to one embodiment of the present disclosure, the plurality of first rods, the second rod and the third rod are made from rubber and integrally formed.

According to yet another aspect, a flexible linkage in an air outlet assembly is provided. The air outlet assembly including a plurality of vanes. The flexible linkage comprises a plurality of first rods, each having a first end and a second end and to be connected with a plurality of ends of vanes; and a second rod to be connected with the first ends of the plurality of the first rods at a lengthwise direction. The plurality of first rods are substantially parallel each other and forms a first angle with the second rod at a natural state and the flexible linkage is configured to deformed to form a second angle different from the first angle when one the plurality of the first rods is moved with one of the plurality of vanes.

According to one embodiment of the present disclosure, the flexible linkage further comprises a third rod connected with the second ends of the plurality of first rods at a lengthwise direction of the third rod. The plurality of first rods are substantially parallel to each other and the second rod and the third rod are substantially parallel to form a rectangular frame.

According to one embodiment of the present disclosure, each of the plurality of first rod is configured to be received in a corresponding recess on an end of the plurality of the vanes.

According to one embodiment of the present disclosure, the plurality of first rod, the second rod and the third rod are made from rubber and integrally formed.

The air outlet assembles of the present disclosure is advantageous in several aspects. For example, because the flexible linkage includes the first rods and the second rod that are integrally formed, the whole flexible linkage may be structured as a deformable integral part. Thus, when a user adjusts the vanes, the flexible part of the flexible linkage deforms, which does not affect the rotation of the vanes. Also, because the flexible linkage is an integrally formed part, its structure is simpler compared with existing technologies. Furthermore, compared with existing linkages which require hinges or hinge shafts, the flexible linkage is more stable because it is an integrally formed part.

BRIEF DESCRIPTION OF DRAWINGS

To more clearly illustrate the embodiments of the present disclosure or technical solutions in existing technologies, the drawings needed in the description of the embodiments are briefly described below. Obviously, the drawings in the following description are only some embodiments of the present disclosure, and those skilled in the art can obtain other drawings based on these drawings without exercising any creative effort.

DETAILED DESCRIPTION

The technical solutions in each embodiment of the present disclosure are clearly and completely described below in combination with the relevant drawings. Obviously, the described embodiments are only part, not all, of the embodiments of the present disclosure. Based on the embodiments described below, those skilled in the art can obtain other embodiments of the present disclosure, which are also within the protected scope of the present disclosure.

Figure 1:
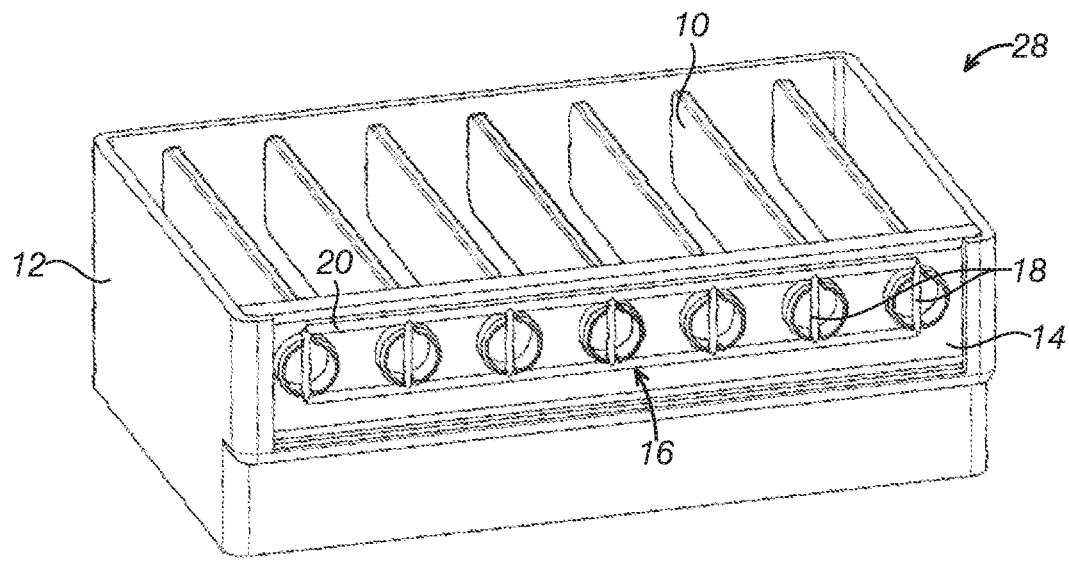
FIG. 1 is a perspective view of an embodiment of the disclosure, in which the sidewall of the housing is partially removed in order to display the internal details.
Figure 2:
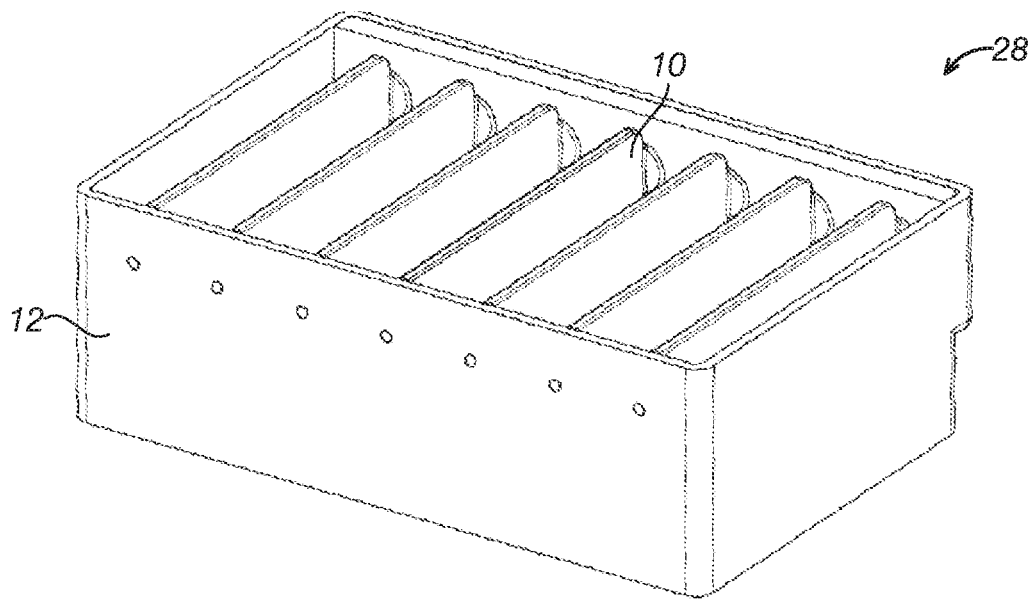
FIG. 2 is a perspective view of the embodiment in FIG. 1 viewed from a different perspective.
Figure 3:
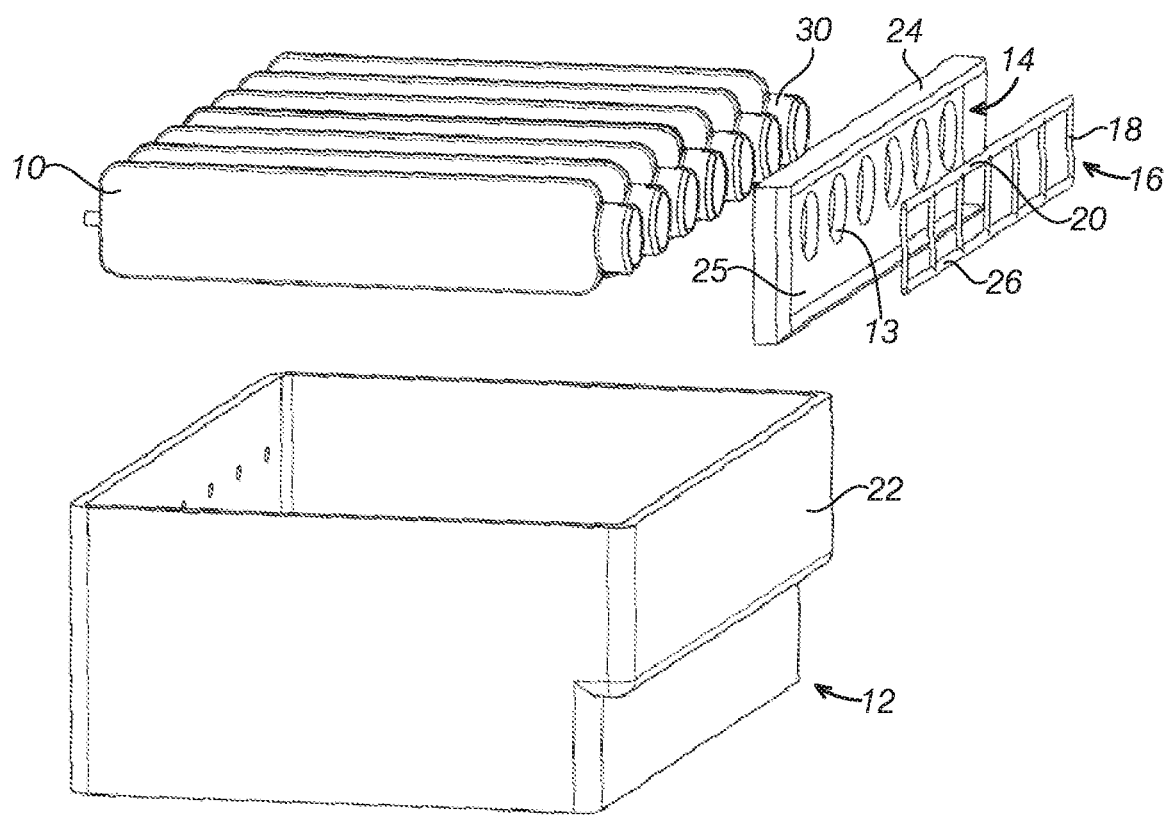
FIG. 3 is an exploded view of the embodiment shown in FIG. 1.

As shown in FIGS. 1-3, in one embodiment of the present disclosure, an air outlet assembly 28 used in a vehicle ventilation system is provided. The air outlet assembly 28 includes a housing 12 and a plurality of vanes 10. An end 30 of each vane 10 rotatably resides on the housing 12. The air outlet assembly 28 further includes a flexible linkage 16, which has a plurality of first rods 18 connected to the ends 30 of the vanes 10, respectively, and a second rod connected to the plurality of first rods 18, wherein the plurality of first rods 18 and the second rod 20 are integrally formed. For simplicity, in the embodiment shown in the figures, the air outlet assembly 28 has a flexible linkage 16 at only one end of the vanes 10. Alternatively, in a different embodiment, flexible linkages may be provided at both ends of the vanes. That is, the air outlet assembly 28 may include a first flexible linkage disposed on one side of the housing 12 and a second flexible linkage disposed on another side of the housing 12. The first and second linkage may have a substantially same configuration.

Figure 6A:
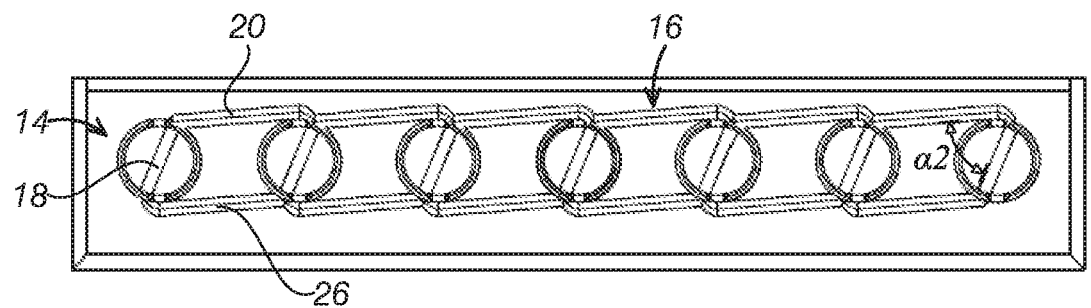
FIG. 6A is a partial illustration of an embodiment of the present disclosure, where the vanes rotate about a first angle and the flexible linkage is deformed.

It should be appreciated that, in the above embodiment, because the flexible linkage 16 includes the first rods 18 and the second rod 20 which are integrally formed, the whole structure of the flexible linkage 16 may be an integrally formed deformable part. Thus, when a user adjusts the direction of the vanes 10 (as shown in FIG. 6A), he/she only needs to adjust any one of the vanes 10 and the remaining vanes 10 would rotate in sync, e.g., rotating about the same angle, with the adjusted vane through the first rods 18 and the second rod 20 that is integrally formed with the first rods 18.

In existing technologies, air outlet assemblies often use rigid linkages to enable synchronized rotation of vanes. However, inventors of the present disclosure have recognized that in such a rigid structure pivot shafts must be installed where the linkages are hinged. Such a rigid linkage is structurally complex and prone to be worn and may not provide stable connections. In the above embodiments of the present disclosure, a flexible linkage 16 is used to make the vanes move in unison. When a user adjusts a vane 10, the flexible part of the flexible linkage 16 deforms (as shown in FIG. 6A), therefore rotating all vanes 10 in unison without affecting the rotation of the vane 10. Furthermore, because the flexible linkage 16 is an integral part, compared with existing technologies, it does not require additional pivot shafts. As such, its structure is simpler and installation is more convenient. Also, because the flexible linkage 16 is an integral part, compared with those non-integral linkages in existing technologies, its structure is more stable.

Continue referring to FIGS. 1-3, in one embodiment, the housing 12 includes a sidewall 22 and may further include a supporting frame 14 with a plurality of openings 13. The end 30 of each vane 10 extends through a corresponding opening 13. The flexible linkage 16 resides within a gap or a space between the supporting frame 14 and the sidewall 22. As such, it does not take additional space and won't increase the size of the air outlet assembly 28. Such structure especially provides a convenient way for installation.

Because the flexible linkage 16 does not extend outside the sidewall 22 of the housing 12, the air outlet assembly 28 has a relatively smooth surface, which prevented the interferences between the flexible linkage 16 and other surrounding parts during installation and operation. In the depicted embodiment, the sidewall 22 may be protruded from a main body of the housing. That is, a portion of the housing 12 containing the flexible linkage and the supporting frame may have a cross section area greater than that of a portion below to save the space. Alternatively, based on certain needs, such as providing a better cost effectiveness, the housing 12 may include a sidewall with openings. The ends 30 of the vanes 10 may be received rotatably in the opening and extend, and may extend outside the housing. And the flexible linkage 16 is installed onto the ends 30 of the vanes 10 from outside the housing.

Referring to FIGS. 1-3 again, according to one embodiment of the present disclosure, the supporting frame 14 further includes a flange 24 for shielding the gap. It should be appreciated that when the various parts shown in FIG. 3 are assembled into the air outlet assembly 28 shown in FIG. 1, the flange 24 can shield the gap between the supporting frame 14 and the sidewall 22. Thus, after assembling the parts together, the user is not able to see the parts such as the flexible linkage 16 residing in the gap between the supporting frame 14 and the sidewall 22, providing a better aesthetic appearance. In some embodiments, the flange 24 may extend substantially perpendicular from a main surface 25 of the supporting frame 24. In some embodiments, a width of the flange 24 can be configured to exactly shield the gap between the supporting frame 14 and the sidewall 22 to obtain a good appearance. In other embodiments, to facilitate the assembly and disassembly of the air outlet assembly, the flange 24 can also be slightly larger than the gap between the supporting frame 14 and the sidewall 22, so that when the assembly is completed, the flange 24 can overlap on top of the sidewall 22. Thus, in some cases for example, if some parts of the air outlet assembly 28 need to be replaced, the assembly may be easily disassembled. In some embodiments, the flange 24 may extend from the main surface 25 on a top of the supporting frame 14. In some embodiment, the flange 24 may extend from the main surface 25 along a circumference of the supporting frame 14.

Figure 4:
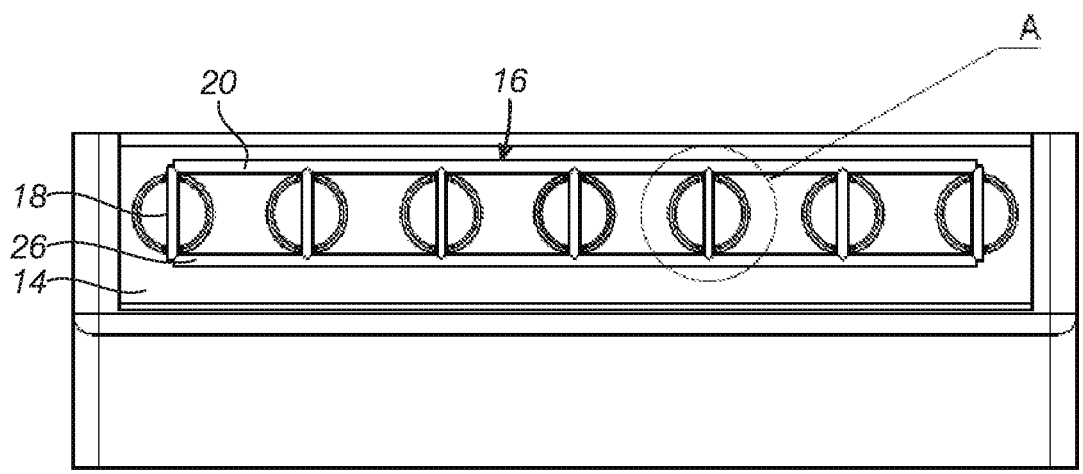
FIG. 4 is the main view of the embodiment shown in FIG. 1, in which the sidewall of the housing is partially removed to show internal details.
Figure 4A:
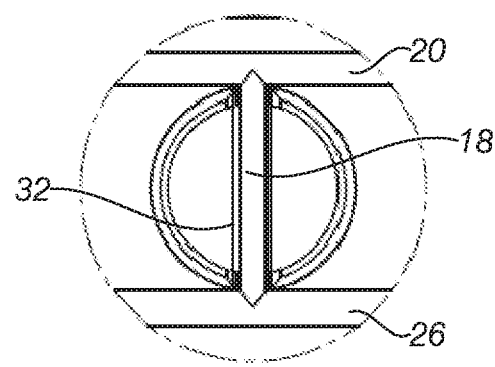
FIG. 4A is a magnified view of part A of the embodiment shown in FIG. 4.

As shown in FIGS. 4-4A, in one embodiment of the present disclosure, the end 30 of each vane 10 has a longitudinal groove 32 to receive the first rod 18. As the flexible linkage is made from plastic deformable material, the first rod 18 may be connected to the end 30 of the vane 10 via interference fit and secured firmly. Additionally or alternatively, an adhesive layer may be disposed between the surface of the longitudinal groove 32 and the first rod 18 to strengthen the connection. Thus, when a user needs to rotate the vanes 10, he/she just needs to rotate any one of the vanes 10, the remaining vanes will rotate in unison through the first rods 18, received in the longitudinal grooves 32, and the second rod 20 formed integrally with the first rods 18, making the vanes to rotate about the same angle. Depending on the situation, the connection between the vanes 10 and the first rods 18 may be achieved in other means. For example, each first rod 18 may be replaced with an annular structure that is fitted around the end 30 of the corresponding vane 10. It should be noted that the first rod or rods 18 are merely used as a component name. It should not be construed to limit the structure of the component. In other words, depending on the situation, a first rod 18 may be an annular component or other forms of components. The present disclosure is not limited to these. Also, based on needs, the plurality of first rods that are connected to the multiple vanes do not necessarily have the same or similar shape or size.

Figure 5:
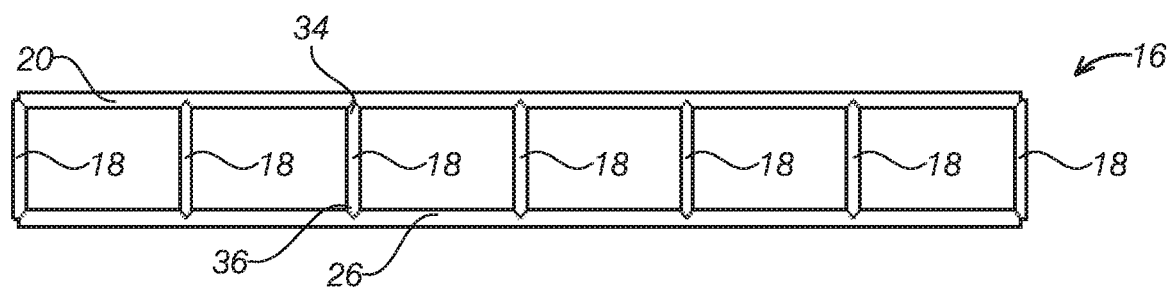
FIG. 5 illustrates a flexible linkage in an embodiment of the present disclosure.

As shown in FIGS. 4 and 5, according to an alternative embodiment of the present disclosure, a first rod 18 includes a first end 34 and a second end 36, which are opposite to each other. The second rod 20 is connected to a plurality of first ends 34 at its lengthwise direction, respectively, and the flexible linkage 16 also includes a third rod 26 that is connected to a plurality of second ends 36 its lengthwise direction. When configuring the third rod 26, the whole structure of the flexible linkage 16 appears as a frame structure as illustrated in FIG. 5. Thus, when a user rotates the vanes 10, the flexible linkage 16, through the second rod 20, which is connected to the first ends 34 of the first rods 18, and the third rod 26, which is connected to the second ends 36, achieves more stable connections to make sure the vanes 10 will not rotate about different angles due to uneven force. Based on needs, additional components like the second rod or the third rod may be added to provide a stronger structural robustness.

In the embodiment shown in FIG. 5, all first rods 18 are substantially parallel to each other, and the second rod and the third rod are substantially parallel. In an alternative embodiment of the present disclosure, the end 30 of a vane 10 may have an annular cross-section. A first rod 18 runs across the annular end of a corresponding vane 10, as shown in FIGS. 4 and 4A. Specifically, in the embodiment shown in the figures, the first rod 18 is at least connected to a certain position on the annular end of the vane 10, aligned in a straight-line configuration that goes through that certain position and the center of the annular end, and connected to another position on both the annular end and the straight-line configuration. In some embodiments, the longitudinal groove 32 is formed along a diameter of the annular cross-section of the vane 10 and the first rod 18 is received in the longitudinal groove 32 and connected with the vane 10. A length of the first rod 18 may be substantially the same as or slightly greater than a diameter of the annular end 30. The plurality of the first rods 18 may be spaced apart from each other at a predetermined distance. For example, a distance between two adjacent first rods 18 may be greater than a diameter of the annual end 30.

Referring back to FIGS. 1 and 3, in one embodiment of the present disclosure, the end 30 of a vane 10 may be in an interference fit with the corresponding opening 13 of the supporting frame 14. Thus, when the vane 10 is inserted in the supporting frame 14, the vane 10 and the supporting frame 14 are more securely connected. When the vehicle is running, the vane 10 won't shake or generate weird noise due to bumps. What should be further noted is that because the flexible linkage 16 will deform after the vanes 10 rotate, the deformed flexible linkage 16 will be charged with forces that tend to restore itself to its initial state. If the ends 30 of the vanes 10 are in an interference fit with the openings 13 of the supporting frame 14, the frictions between them would cancel out the restoration force of the flexible linkage 16, preventing the vanes 10 from unexpectedly returning to their initial state under the drive by the flexible linkage 16, therefore securing the vanes 10 at any position wanted by a user.

In one embodiment of the present disclosure, the flexible linkage 16 may be an elastic part. It should be appreciated that the whole structure of the flexible linkage 16 may be made from elastic material; or, only part of the flexible linkage 16 is made from elastic material. It should be understood that any suitable material which can make the flexible linkage 16 elastically deformable can be applied in the present disclosure. For example, such material may include, but is not limited to rubber, silicone, TPE, flexible metal materials, etc.

Further, in another embodiment of the present disclosure, the flexible linkage 16 may be a rubber frame member. In other words, in this embodiment, the first rods 18 and the second rod 20 of the flexible linkage 16 are all rubber components. In other embodiments that include the third rod 26, the third rod 26 may also be constructed from a rubber member.

Figure 6B:
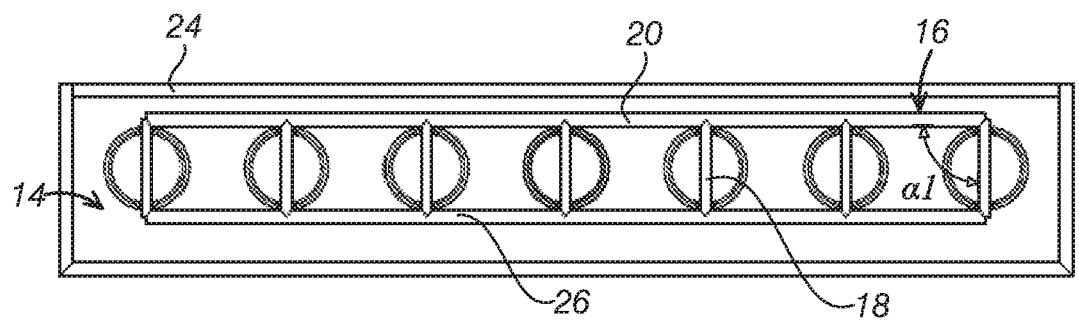
FIG. 6B is a partial illustration corresponding to the embodiment shown in FIG. 6A, where the vanes and the flexible linkage are restored to the initial state.

FIGS. 6A and 6B are a partial illustration of an embodiment of the present disclosure, illustrating the flexible linkage at different states. FIG. 6B shows the flexible linkage 16 at a natural state or the state without deformation. In the depicted embodiment, the flexible linkage 16 is of a rectangular shape formed by a plurality o first rods 18, a second rod 20 and a third rod 26. A first angle α1 is formed between the first rod 18 and the second rod 20 at the natural state. In one example, the first angle α1 may be substantially 90 degree. FIG. 6B shows the flexible linkage 16 at a deformed state. When one of the vane 30 is moved (e.g., an adjustment vane is rotated by a user), a first rod 18 connected to the adjustment van is rotated, causing movement of the second rod 20 and the third rod 26 so that the flexible linkage is deformed. At the deformed state, an angle α2 is formed between the first rod 18 and the second rod 20, which is different from the first angle α1. The deformation allows for unison movement of the flexible linkage. In this way, no pivot shaft is needed.

The above descriptions are merely preferred embodiments of the present disclosure and should not be construed to limit the scope of the present disclosure. And, to those skilled in the art, the present disclosure may have various variations and changes. Any modification, equivalent replacement, or improvement made in the spirit and principles of the present disclosure shall be included in the scope of protection of the disclosure.

The invention claimed is:

1. An air outlet assembly for a vehicle ventilation system, comprising:
    a housing,
    a plurality of vanes having a plurality of ends, wherein the plurality of ends rotatably reside on the housing, and
    a flexible linkage having a plurality of first rods and a second rod,
    wherein the plurality of first rods are connected to the plurality of ends of the vane, respectively, and the second rod is connected to the plurality of first rods, and wherein the plurality of first rods and the second rod are integrally formed, and made from plastic deformable material, and
    wherein each of the plurality of ends of the vanes has an annular cross section and includes a longitudinal groove extending along an entire length of a diameter of the cross section, and a corresponding first rod is received in the longitudinal groove and connected to an end of a corresponding vane via interference fit.

2. The air outlet assembly of claim 1, wherein the housing comprises a sidewall and a supporting frame having a plurality of openings, the plurality of ends extends through the plurality of openings, respectively, and the flexible linkage resides within a gap between the sidewall and the supporting frame.

3. The air outlet assembly of claim 2, wherein the supporting frame further includes a flange for shielding the gap.

4. The air outlet assembly of claim 2, each of the plurality of ends of the vane are in an interference fit with a corresponding opening of the supporting frame.

5. The air outlet assembly of claim 1, wherein each of the plurality of first rods of the flexible linkage has a first end and a second end opposite to the first end, and wherein the second rod is connected to a plurality of first ends, and the flexible linkage further includes a third rod that is connected to a plurality of second ends.

6. The air outlet assembly of claim 5, all of the plurality of first rods are substantially parallel to each other and the second rod and the third rod are substantially parallel.

7. The air outlet assembly of claim 5, wherein the diameter of the cross section of the end of the plurality of vanes is substantially the same as a distance between the second rod and the third rod.

8. The air outlet assembly of claim 1, wherein the flexible linkage is an elastic part.

9. An air outlet assembly for a vehicle ventilation system, comprising:
    a housing,
    a plurality of vanes having a plurality of ends, wherein the plurality of vanes are disposed in the housing, and
    a flexible linkage having a plurality of first rods and a second rod, wherein the plurality of the first rods are spaced apart each other and connected the second rod along a lengthwise direction of the second rod, respectively;
    wherein the plurality of first rods are connected to the plurality of ends of the vanes, respectively, and the flexible linkage is deformed when one of vane is rotated such that a rotation of the one vane enables rest of the vanes to be rotated in a substantially same angle via the flexible linkage;
    wherein each of the plurality of first rods of the flexible linkage has a first end and a second end opposite to the first end, and wherein the second rod is connected to a plurality of first ends at a lengthwise direction, and the flexible linkage further includes a third rod that is connected to a plurality of second ends at the lengthwise direction;
    wherein the plurality of first rods, the second rod and the third rod are made from rubber and integrally formed to have a frame work; and
    wherein each of the plurality of ends of the vanes has a longitudinal groove for receiving a corresponding first rod of the flexible linkage and to connect the corresponding first rod via an interference fit.

10. The air outlet assembly of claim 9, further comprising a supporting frame having a main body, a plurality of openings, and a flange extending substantially perpendicular from the main body, wherein the plurality of ends of the vane extend through the plurality of openings, respectively, wherein the flexible linkage is disposed in a space between a sidewall of the housing and the supporting frame, and wherein the flange is configured to cover the space.

11. The air outlet assembly of claim 9, wherein the plurality of first rods are substantially parallel to each other, and the second rod and the third rod are substantially parallel, wherein each of the plurality of ends of the vanes has an annular cross section, a distance between two adjacent first rods is greater than a diameter of the annular cross section, the diameter of the annular cross section is substantially the same as a distance between the second rod and the third rod, and the first rod extends along an entire length of the diameter of the annular cross section.

12. A flexible linkage in an air outlet assembly, the air outlet assembly including a plurality of vanes, the flexible linkage comprising:
- a plurality of first rods, each having a first end and a second end and to be connected with a plurality of ends of the plurality of vanes;
- a second rod to be connected with the first ends of the plurality of the first rods at a lengthwise direction, and
- a third rod connected with the second ends of the plurality of first rods at a lengthwise direction of the third rod;
- wherein the plurality of first rods are substantially parallel to each other and the second rod and the third rod are substantially parallel to form a rectangular frame;
- wherein the plurality of first rod, the second rod and the third rod are made from rubber and integrally formed;
- wherein the plurality of first rods are substantially parallel each other and forms a first angle with the second rod at a natural state and the flexible linkage is configured to deformed to form a second angle different from the first angle when one the plurality of the first rods is moved with one of the plurality of vanes; and
- wherein each of the plurality of ends of the vanes has a longitudinal groove for receiving a corresponding first rod of the flexible linkage and to connect the corresponding first rod via an interference fit.

* * * * *